(12) United States Patent　　(10) Patent No.: US 7,624,108 B1
Goldberg et al.　　(45) Date of Patent: Nov. 24, 2009

(54) METHOD AND APPARATUS FOR FORMALLY SPECIFYING APPLICATION-SPECIFIC READ/WRITE CONSISTENCY

(75) Inventors: Robert N. Goldberg, Emerald Hills, CA (US); Bruce K. Daniels, Capitola, CA (US); Yury Kamen, Foster City, CA (US); Syed M. Ali, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1522 days.

(21) Appl. No.: 10/603,884

(22) Filed: Jun. 25, 2003

(51) Int. Cl.
　　*G06F 7/00*　　(2006.01)
　　*G06F 17/30*　　(2006.01)
(52) U.S. Cl. .......................................................... 707/8
(58) Field of Classification Search ....................... None
　　See application file for complete search history.

(56) References Cited

U.S. PATENT DOCUMENTS 5,615,362 A * 3/1997 Jensen et al. ............ 707/103 R
5,706,506 A * 1/1998 Jensen et al. ............ 707/103 R
6,094,600 A * 7/2000 Sharpe et al. ................. 700/19

\* cited by examiner

*Primary Examiner*—Neveen Abel Jalil
*Assistant Examiner*—Michael J Hicks
(74) *Attorney, Agent, or Firm*—Osha • Liang LLP

(57) ABSTRACT

A system for specifying read/write consistency for an application including an application including at least one transaction, wherein the at least one transaction includes at least one of a plurality of states, at least one of a plurality of transitions, and at least one artifact; and a database operatively connected to the application, wherein the application accesses data associated with the at least one artifact using a read/write consistency specification; wherein the read/write consistency specification specifies at least one selected from the group consisting of a read consistency and a write consistency for the at least one artifact within the transaction.

17 Claims, 3 Drawing Sheets

METHOD AND APPARATUS FOR FORMALLY SPECIFYING APPLICATION-SPECIFIC READ/WRITE CONSISTENCY

BACKGROUND OF INVENTION

Modern enterprise applications are typically implemented as multi-tier systems. Multi-tier systems serve the end-user through a chain of client/server pairs. In general, they include a user interface at the front end, a database management system (DBMS) at the back end, and an application server interposed between the user interface and the database. Depending on the component providing the user interface, an additional middle tier may exist between the user interface and the application server. For example, if the user interface is provided by a web browser, a web server would exist between the web browser and the application server. The web browser would send requests to the web server, and the web server would interact with application data in the database through the application server in order to generate a response to send to the web browser. In this scenario, the web browser and web server form a client/server pair, the web server and application server form another client/server pair, and the application server and DBMS server form yet another client/server pair.

FIG. 1 shows an example of a four-tiered system that includes a user interface tier (2), a web server tier (4), an application server tier (6), and a data tier (8). The user interface tier (2) is the layer of interaction and typically includes a form-like graphical user interface (GUI) displayed by a display component, often a web browser (10). The web server tier (4) includes web components (12) hosted on a web server (14). The web components (12) generate the content displayed by the web browser (10). The application server tier (6) includes application components (16) hosted on an application server (18). The application components (16) model the business rules, typically through interaction with application data. The data tier (8) includes a persistent data store, typically a database management system (DBMS) (22) and a database (i.e., a persistent transactional data store) (20).

The web browser (10) and the web server (14) form a client/server pair. The web server (14) and the application server (18) form another client/server pair. The application server (18) and DBMS (22) form yet another client/server pair. A web component (12) and an application component (16) are in a client/server relationship when the web component (12) (client) uses services of the application component (16) (server) to provide functions to the system. In order for the client and server to collaborate, a contract or interface definition exists, between the client and server that specifies the server methods that can be invoked by the client. When the client and server are in different address spaces, the client uses some form of remote procedure call (RPC) to invoke the server methods. Typically, this involves the client calling into a local stub, which forwards the call to the server.

Multi-tiered enterprise applications, such as described above, are difficult to write because they are inherently complex. The enterprise application developers are expected to be well-versed in many subject areas. The enterprise application developers are expected to be able to understand the business problem and logic to solve the problem, group business logic into transactions, understand how to retrieve and update information in the database, and know how to use multiprocessing capabilities to enhance performance of the enterprise application. The enterprise application developers also take into account the type of clients to be supported and the communication protocol to be used between the client and server, the type of server and the enterprise application program interfaces (APIs) supported by the server, and the type of database management system (DBMS) used in managing the database.

In designing and implementing multi-user enterprise applications, application programmers balance data consistency with scalability. In particular, the application programmer ensures that for each transaction the correct data is available for the enterprise application. If application programmers do not consider concurrency control when designing and implementing enterprise application numerous problems can arise. Three typical problems that arise are (i) the lost update problem; (ii) the temporary update problem; and (iii) the incorrect summary problem.

The lost update problem occurs when two concurrent transactions access the same database items and their operations are interleaved in a manner that makes some of the values of the database items incorrect. The temporary update problem occurs when one transaction updates a database item and then the transaction fails for some reason. The updated database item is subsequently accessed by a second transaction before the database item value is changed back to its original value. Finally, the incorrect summary problem occurs when one transaction is calculating an aggregate summary function on a number of records while other transactions are updating some of these records.

The aforementioned problems have been addressed most successfully by using binary read locks and two-phase locks. However, these solutions are not ideal for scalable enterprise applications. Accordingly, the computer industry has moved towards using database systems that have very optimistic read locks or no read lock mechanisms. Alternatively, some database systems have shifted focus from providing read locking to concentrate on resolving write conflicts. In either situation, application programmers using these new database systems are required to insert additional read isolation program logic to enforce read/write consistency that matches the level of read/write isolation that is required by the enterprise application.

SUMMARY OF INVENTION

In general, in one aspect, a system for specifying read/write consistency for an application, comprising an application comprising at least one transaction, wherein the at least one transaction comprises at least one of a plurality of states, at least one of a plurality of transitions, and at least one artifact, and a database operatively connected to the application, wherein the application accesses data associated with the at least one artifact using a read/write consistency specification, wherein the read/write consistency specification specifies at least one selected from the group consisting of a read consistency and a write consistency for the at least one artifact within the transaction.

In general, in one aspect, a method for generating an application, comprising obtaining a business object specification that defines at least one artifact, obtaining an application usage specification that defines the application as a plurality of states and a plurality of transitions, wherein the at least one artifact is associated with a state, obtaining a read/write consistency specification that corresponds to at least one transaction, wherein the at least one transaction comprises at least one of the plurality of states and one of the plurality of transitions and the read/write consistency specification includes at least one selected from the group consisting of a read consistency and a write consistency for the at least one artifact within the transaction, and generating the application using the business object specification, the application usage specification, and the read/write consistency specification, wherein the artifact is one selected from the group consisting of a variable, a relationship, and an attribute.

In general, in one aspect, an apparatus for generating an application, comprising means for obtaining a business object specification that defines at least one artifact, means for obtaining an application usage specification that defines the application as a plurality of states and a plurality of transitions, wherein the at least one artifact is associated with a state, means for obtaining a read/write consistency specification that corresponds to at least one transaction, wherein the at least one transaction comprises at least one of the plurality of states and one of the plurality of transitions and the read/write consistency specification includes at least one selected from the group consisting of a read consistency and a write consistency for the at least one artifact within the transaction, and means for generating the application using the business object specification, the application usage specification, and the read/write consistency specification, wherein the artifact is one selected from the group consisting of a variable, a relationship, and an attribute.

Other aspects and advantages of the invention will be apparent from the following description and the appended claims.

DETAILED DESCRIPTION

Figure 1:
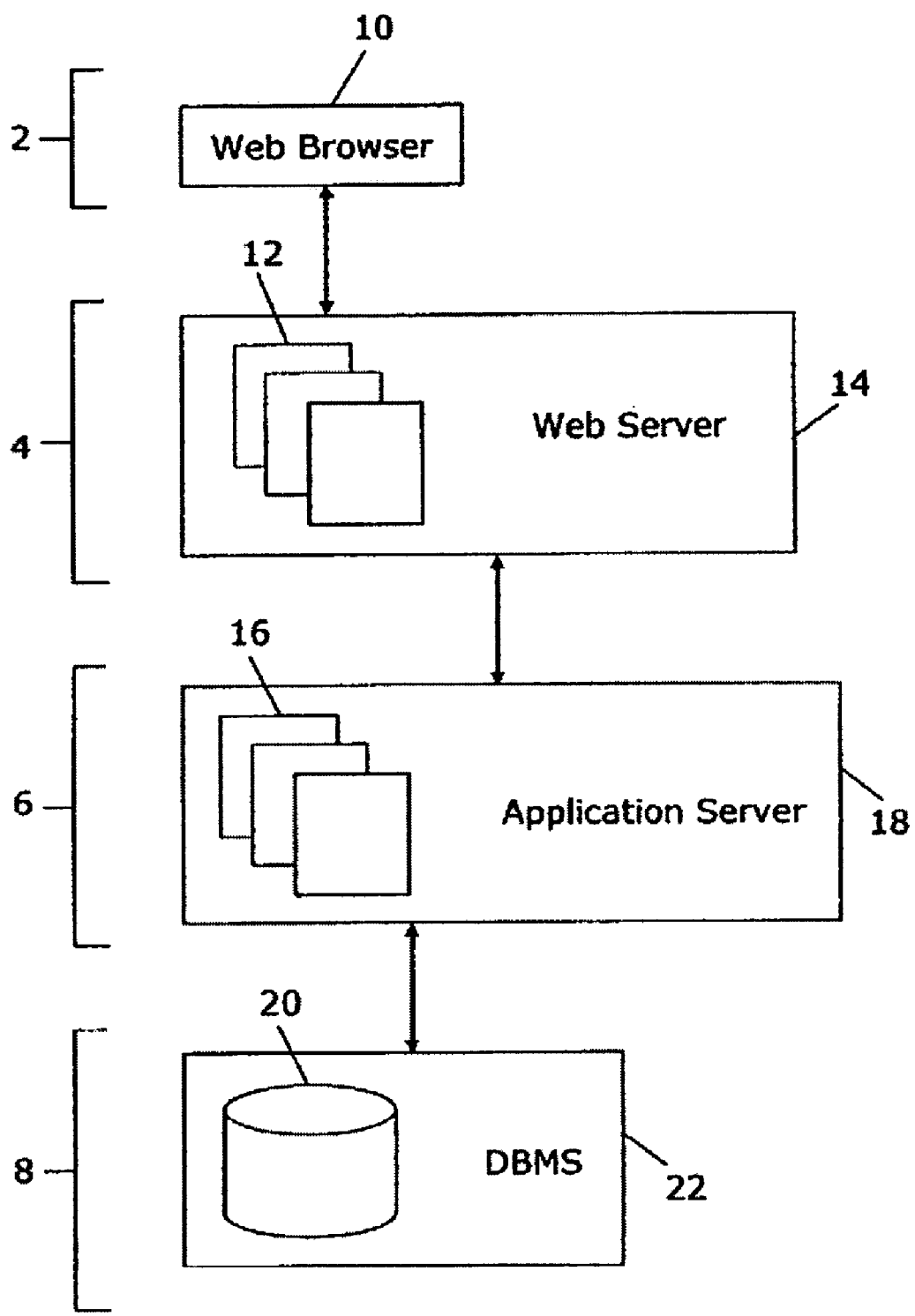
FIG. 1 illustrates a typical multi-tier system.

Exemplary embodiments of the invention will be described with reference to the accompanying drawings. Like items in the drawings are denoted by the same reference numbers through out for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
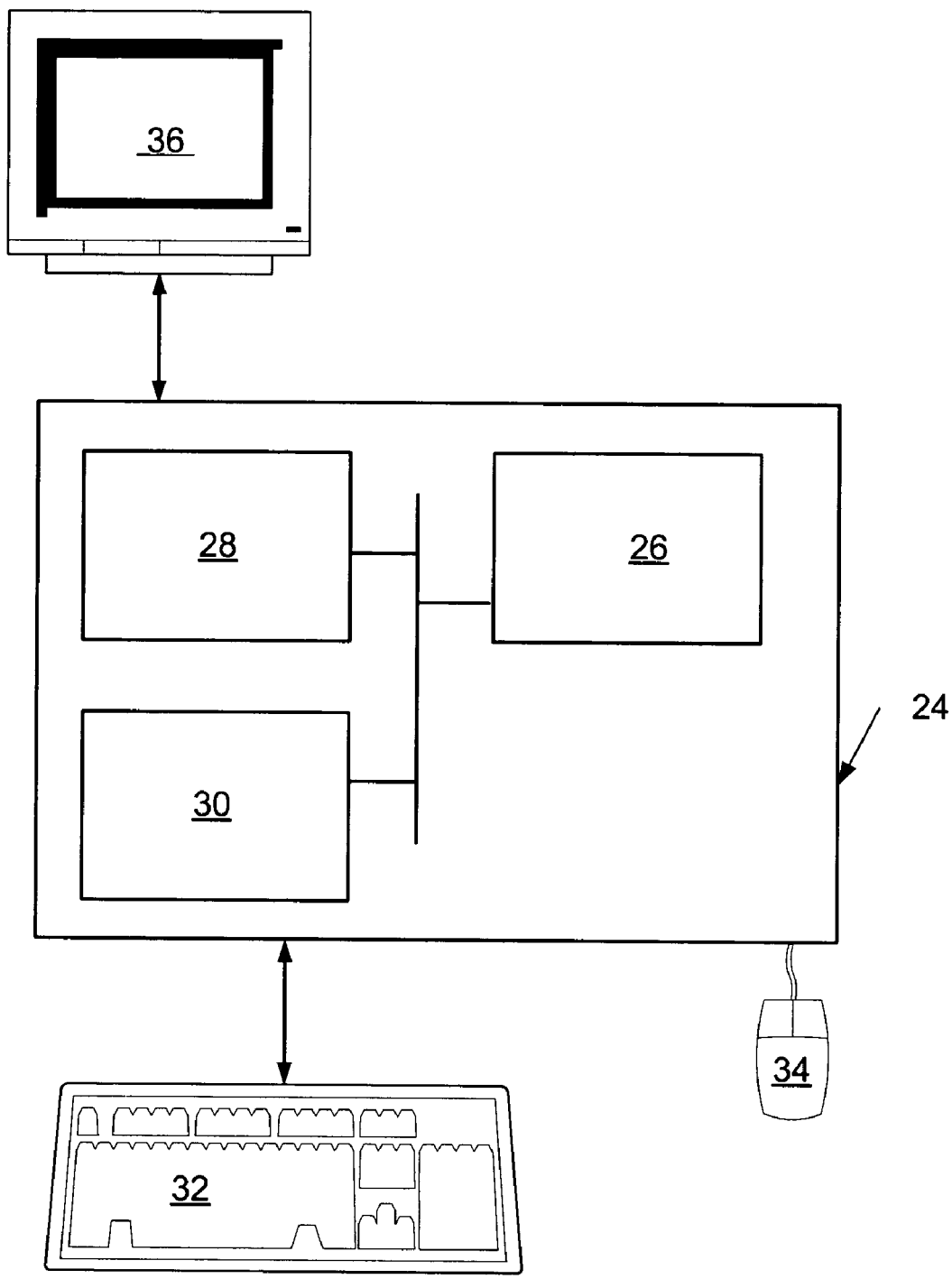
FIG. 2 illustrates a typical computer system.

The invention may be implemented on virtually any type computer regardless of the platform being used. For example, as shown in FIG. 2, a typical computer (24) includes a processor (26), associated memory (28), a storage device (30), and numerous other elements and functionalities typical of today's computers (not shown). The computer (24) may also include input means, such as a keyboard (32) and a mouse (34), and output means, such as a monitor (36). Those skilled in the art will appreciate that these input and output means may take other forms.

Figure 3:
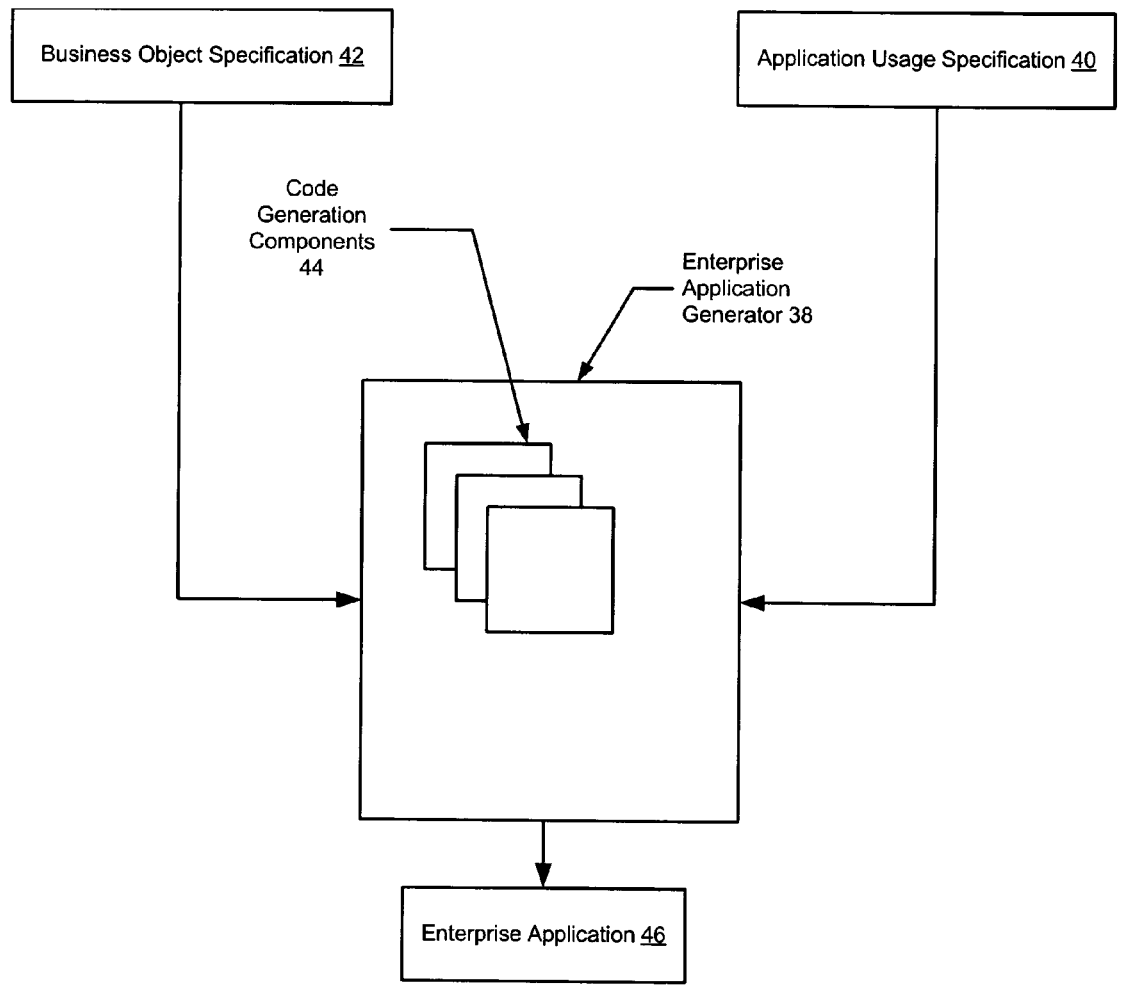
FIG. 3 illustrates a flow diagram for the development and generation of an enterprise application in accordance with one embodiment of the invention.

The invention relates to a method for specifying application-specific read/write consistency. The specifying of the application-specific read/write consistency may occur on a per-datum basis. FIG. 3 illustrates a flow diagram for the development and generation of an enterprise application in accordance with one embodiment of the invention. The enterprise application generator (EAG) (38) takes a business object specification (BOS) (42) and an application usage specification (AUS) (40) as inputs and generates an enterprise application (EA) (46). Those skilled in the art will appreciate the BOS (42) may correspond a database schema, an Enterprise Java™ Bean (EJB™) deployment descriptor, etc.

The BOS (42) defines the characteristics of all business objects to be used in the EA (46). These characteristics may include, but are not limited to, attributes, attribute constraints, persistence information, triggers, relationships, business object methods, etc. For example, the BOS (42) may define a trigger for a particular business object such that when a specific event occurs, such as an update to a data field in a database, a set of Structured Query Language (SQL) statements is "fired-off" to perform an integrity check on the database. Additionally, in accordance with one embodiment of the invention, the business object methods define enterprise application and process logic. Further, the BOS (42) defines the relationships between the various business objects.

The AUS (40) defines how the business objects, as defined by the BOS (42), are to be used within the enterprise application. Further, the AUS (40) defines the level of read isolation for data used within a given transaction. In one or more embodiments of the invention, the AUS (40) is defined as a series of states and transitions. Further, the AUS (40) may also define a transaction, where the transaction includes particular states and transitions. A state defines an interaction with a client (i.e., a user, another enterprise application, a web service, etc.). The interaction may include, but is not limited to, a user gesture (e.g., a button click, voice commands, etc.), an interaction from another enterprise application (e.g., via a web service using Simple Object Access Protocol (SOAP)), etc. Those skilled in the art will appreciate that an interaction may take on other forms.

Additionally, the AUS (40) may also define interaction variables. The interaction variable defines a piece of data which interacts with the user or facilitates interactions within the enterprise application or with the end user, e.g., parameters passed between states, shared variables, session variables, state variables, etc.

In one embodiment of the invention, an integrated development environment (IDE) is used to graphically define the application usage specification. In one embodiment of the invention, the IDE is Sun™ One Studio. (Sun™ is a trademark of Sun Microsystems).

Referring back to FIG. 3, the EAG (38) includes a number of code generation components (CGC) (44). The CGC (44) correspond to generator components designed specifically for a particular platform. For example, if an enterprise application is deployed on an Apache Web Server, a Sun™ One Application Server, and Oracle® Database Management System, the EAG (38) contains CGC (44) corresponding to the Apache Web Server, the iPlanet™ Application server, and the Oracle® Database Management System. (Sun™ is a trademark of Sun Microsystems, and Oracle® is a registered trademark of the Oracle Corporation).

Further, the CGC (44) encapsulates best-mode practices to produce optimized efficient code for the various components in the enterprise application (46). For example, the EAG (38) includes functionality to increase performance efficiency of the generated enterprise application by optimizing enterprise application implementation code. This optimization may include, but is not limited to, (i) the use and generation of optimal distribution protocols to ensure maximal network access and response time within a given platform for high enterprise application performance and scalability; (ii) optimization for lock contention; (iii) optimization for memory usage; (iv) optimization for processor usage; (v) optimization for code readability, etc.

In the event that a particular component within the enterprise application (46) changed, the enterprise application (46) may be re-generated using the same AUS (40) and BOS (42) provided that the appropriate CGC (44) are present in the EAG (38). Further, in one or more embodiments of the invention the EAG (38) also includes functionality to determine the most efficient platform for deployment based on the AUS (40) and BOS (42) input into the EAG (38).

Alternatively, the AUS (40) and the BOS (42) may be interpreted directly or complied into a form that may be interpreted to produce an enterprise application.

In one or more embodiments of the invention, read/write consistency is formally specified within the AUS. In particular, the application programmer may define, on a per-datum basis, the level of read/write consistency to be enforced. The read/consistency specification is formally specified with respect to artifacts (i.e., variables, relationships, attributes, etc.) within a transaction. However, based on the architecture of enterprise applications generated using the EAG (38), a transaction may include one or more transitions. As such, the read/write consistency formal specification, while specified on a transaction level, may also operate on the transition level (e.g., a value for a particular variable may be re-read at every transition within a transaction). In one embodiment of the invention, the read/write consistency specification is defined within the AUS. Alternatively, the read/write consistency specification may be defined in a separate file and combined with the AUS and BOS within the EAG to generate the EA.

In one or more embodiments of the invention, the read/write consistency formal specification is separated into two distinct categories: (1) read consistency; and (2) write consistency. Within the read consistency category, the sub-categories include: (i) <None>; (ii) <RO>; (iii) <RR>; and (iv) <RC>. <None> indicates that the variable is not to be read by the enterprise application. <RO> indicates that the variable is read once at the start of a transaction and not updated. <RR> indicates that the variable is re-read (i.e., kept up-to-date when other transactions modify the value of the variable). <RC> indicates that the variable is read consistent (i.e., changes by other transactions to the variable result in a rollback being performed).

Within the write category, the sub-categories include: (i) <None>; (ii) <C>; (iii) <WO>; (iv) <WA>; and (v) <WC>. <None> indicates that the variable is not written to by the application. <C> indicates that the application can create the object in which this variable occurs. In this case, the read consistency categories are not considered. <WO> indicates that the application may write over (i.e., silently replace) any changes made by other transactions. <WA> indicates that the application may write append (i.e., append changes to changes already made to the variable by other transactions). <WC> indicates that the variable is write consistent (i.e., changes made by other transactions result in a rollback being performed).

In one embodiment of the invention, the read consistency and write consistency specifications may be implemented in an application architecture that is defined as a series of states and transitions. Further, each transition is associated with a transaction. Each transaction may include one or more states and transitions. Entering and exiting a given transaction may trigger a commit or a rollback.

With respect to the aforementioned embodiment, specifying that a given attribute has a read consistency of <RO> indicates that the attribute is read upon entering the first state of the transaction. While the application remains in the transaction, the attribute is not be re-read. Specifying that a given attribute has a read consistency of <RR> indicates that the attribute is read upon entering the first state of the transaction. While the application is in this particular transaction, the attribute is updated if its value is changed by other concurrently running applications. Specifying that a given attribute has a read consistency of <RC> indicates that the attribute is to be read upon entering the first state of the transaction. While the application is in this particular transaction, the application monitors the value of the attribute. If the value of the attribute changes the application forces the transaction to rollback. However, if the value of the attribute does not change while the application is in a particular transaction then the transaction commits.

With respect to the aforementioned embodiment, specifying that a given attribute has a write consistency of <WO> indicates that the current transaction, during a commit, may write over the current value of the attribute regardless of the current value of the attribute. Specifying that a given attribute has a write consistency of <WA> indicates that the current transaction may not write over the current value of the attribute during a commit but rather may append a piece of data to the current data in the attribute. Specifying that a given attribute has a write consistency of <WA> indicates that the application in this particular transaction monitors the value of the attribute. If the value of the attribute changes the application forces the transaction to rollback. However, if the value of the attribute does not change while the application is in a particular transaction then the transaction commits.

In one or more embodiments of the invention, the read/write consistency is implemented in the AUS using an optimistic concurrency model interacting with a pessimistic database implementation.

Using the above described categories and sub-categories, an application programmer may rigorously specify the level of read/write consistency, as required by the application, on a per-datum basis. In one embodiment of the invention, the application programmer may specify the read/write consistency by selecting, at most, one sub-category from each of the aforementioned categories. If no sub-category is expressly specified, then a default sub-category may be applied by the EAG (38). For example, the EAG (38) may default to the <none> sub-category when no sub-category is specified for a particular category. Further, the application programmer may use the aforementioned categories to define all root variables as well as all variables that are accessible from the particular root variable. Those skilled in the art will appreciate that the categories and sub-categories may be defined differently without changing the scope of the invention.

Those skilled in the art is appreciate that when implementing the formal read/write consistency specification in the code generators additional runtime support for optimistic concurrency may be required.

The following examples illustrate various uses of the aforementioned read/write consistency specification and are not intended to limit the scope of the application.

EXAMPLE 1

Maintaining a Journal Entry in a String Variable

Code Sample 1

```
usage {
   comments: (RR, WA);
}
```

In this example the variable comments is re-read on each transition, such that changes made to comments are visible and changes made to comments within a transaction are appended to changes made by a previous transaction. For example, if comments="hello.", and a first transaction changes comments to "hello. goodbye.", and a second transaction changes and commits the value of comments to "hello. hi." before the first transaction commits, then comments becomes "hello. hi. goodbye." for subsequent transactions. Thus, this combination of <RA> and <WA> is appropriate for maintaining a journal entry variable associated with an object.

EXAMPLE 2

Inventory Count (Read Only)

Code Sample 2

```
usage {
   numberInStock: (RR);
}
```

In this example, the variable numberInStock is re-read on each transition. Changes made to numberInStock by other transactions are visible and do not cause this transaction to fail.

EXAMPLE 3

Inventory Count (Modified by this Transaction)

Code Sample 3

```
usage {
   numberInStock: (RR, WC);
}
```

In this example, the variable numberInStock is re-read on each transition. Changes made to numberInStock by other transactions are visible and but do not cause this transaction to fail. The transaction in code sample 3 is used to change the variable, and once the variable is changed inside the transaction begins, no other transactions may change the value of numberInStock until this transaction commits. For reasonable performance, this transaction should avoid changing the variable until the transaction is about to commit, e.g., by modifying the numberInStock variable using a business object method in the final transition that commits the transaction. This mode provides a way to handle read/write consistency for variables that are updated by many transactions, such as an inventory count in a purchase application.

EXAMPLE 4

Highest Level of Isolation

Code Sample 4

```
usage {
   x: (RC, WC);
}
```

This example illustrates complete read/write locking for a particular variable. Thus, no other transaction is allowed to change the variable x between the time this transaction first reads the variable x and the time that the transaction commits. This level of read/write consistency is typically used by bank transactions involving money transfers.

EXAMPLE 5

Low Level of Isolation

Code Sample 5

```
usage {
   x: (RO, WO);
}
```

In this example, a transaction obtains the value of the variable x once, and ignores changes made to variable x by other transactions. When the transaction commits, changes made by any other transaction are over written with the current value of the variable x in this transaction. Thus, the value of the variable x corresponds to the last transaction to commit.

EXAMPLE 6

Write-Safe But not Read Consistent (Read Once)

Code Sample 6

```
usage {
   x: (RO, WC);
   y: (RO, WC);
   xPlusY: (RO, WC);
}
```

In this example, the transaction always sets the variable xPlusY=x+y prior to committing. In a situation where a first transaction changes only x, while simultaneously a second transaction changes only y, and then these two transactions both commit, of necessity, one commits before the other, and the last transaction to commit sets the value of xPlusY. Clearly, xPlusY may not be the sum x+y in this case, because the RC condition was not imposed on x and y.

EXAMPLE 7

Write-Safe But not Read Consistent (Re-Read)

Code Sample 7

```
usage {
   x: (RR, WC);
   y: (RR, WC);
   xPlusY: (RR, WC);
}
```

As in example 6, if the transaction always sets the variable xPlusY=x+y before committing, and that a first transaction changes only x, while simultaneously a second transaction changes only y, and then these two transactions both commit, of necessity, one transaction commits before the other, and the last transaction to commit sets the value of xPlusY. If the last transaction to commit did retrieve the changed value of the other variable, e.g., because it had a multi-state transaction, then the last transaction to commit sets xPlusY to be the correct sum x+y in that case, even though the RC condition was not imposed on x and y. However, if the last transaction to commit did not note the change made to the other variable, e.g., because intra-transaction transition was not made after the other transaction committed, then xPlusY may be set incorrectly.

In one embodiment of the invention, the read and write consistency of the attributes are specified in the AUS, and the AUS interacts directly with a relational database. In another embodiment of the invention, the AUS interacts with the BOS which in turn interfaces with the relational database.

In one embodiment of the invention, the read and write consistency may be conditionally specified, e.g., specified using an "if . . . then" statement.

Embodiments of the invention may have one or more of the following advantages. The invention allows a read/write consistency to be specified on a per-application basis. Further, the invention allows the application programmer to specify both the level of read consistency and write consistency. Thereby the application provides read/write consistency at a level that matches the application requirements. Further, the invention automates the placement of read/write consistency code into the application, thereby reducing coding errors and reducing the possibility of not inserting read/write constraints at all the necessary places within an application.

While the invention has been described with respect to a limited number of embodiments, those skilled in the art, having benefit of this disclosure, is appreciate that other embodiments can be devised which do not depart from the scope of the invention as disclosed herein. Accordingly, the scope of the invention should be limited only by the attached claims.

What is claimed is:

1. A system for specifying consistency for an application, comprising:
    an application comprising a transaction, wherein the transaction comprises at least one of a plurality of states, at least one of a plurality of transitions, and at least one artifact; and
    a database operatively connected to the application;
    wherein the application accesses data from the database associated with the at least one artifact using a consistency specification when the application enters the at least one of the plurality of the states; and
    wherein the consistency specification specifies at least one of a read consistency and a write consistency to apply to the at least one artifact.

2. The system of claim 1, wherein the application is defined using an application usage specification.

3. The system of claim 1, wherein the application is designed using an application usage specification and a business object specification.

4. The system of claim 3, wherein the business object specification defines a variable of a business object.

5. The system of claim 4, wherein the business object specification defines how the business object is to be used in within the plurality of states and the plurality of transitions using the application usage specification.

6. The system of claim 1, wherein the application is designed using an application usage specification and a database schema.

7. The system of claim 6, wherein the database schema defines an attribute in a database schema.

8. The system of claim 7, wherein the database schema defines how the attribute is applied within the plurality of states and the plurality of transitions using the application usage specification.

9. The system of claim 1, wherein the database is a relational database.

10. The system of claim 1, wherein the read consistency includes at least one selected from the group consisting of none, read once, re-read, and read consistent.

11. The system of claim 1, wherein the write consistency includes at least one selected from the group consisting of none, creating an object, write over, write append, and write consistent.

12. The system of claim 1, wherein the artifact is one selected from the group consisting of a variable, an attribute, and a relationship.

13. A method for generating an application, comprising:
    obtaining a business object specification that defines at least one artifact;
    obtaining an application usage specification that defines the application as a plurality of states and a plurality of transitions, wherein the at least one artifact is associated with one of the plurality of states;
    obtaining a consistency specification that corresponds to at least one transaction, wherein the at least one transaction comprises at least one of the plurality of states and one of the plurality of transitions and the consistency specification includes at least one of a read consistency and a write consistency to apply to the at least one artifact; and
    generating the application using a database schema, the application usage specification, and the consistency specification;
    wherein the artifact is one selected from the group consisting of a variable, a relationship, and an attribute
    wherein the application accesses data from a database associated with the at least one artifact using the consistency specification when the application enters the at least one of the plurality of the states.

14. The method of claim 13, wherein the read consistency includes at least one selected from the group consisting of none, read once, re-read, and read consistent.

15. The method of claim 13, wherein the write consistency includes at least one selected from the group consisting of none, creating an object, write over, write append, and write consistent.

16. A computer-readable medium having recorded thereon instructions executable by a processor, the instructions for:
    obtaining a database schema that defines at least one artifact;
    obtaining an application usage specification that defines the application as a plurality of states and a plurality of transitions, wherein the at least one artifact is associated with one of the plurality of states;
    obtaining a consistency specification that corresponds to at least one transaction, wherein the at least one transaction comprises at least one of the plurality of states and one of the plurality of transitions and the consistency specification includes at least one of a read consistency and a write consistency to apply to at least one artifact; and
    generating the application using the database schema, the application usage specification, and the consistency specification,
    wherein the application accesses data from a database associated with the at least one artifact using a consistency specification when the application enters the at least one of the plurality of the states.

17. An apparatus for generating an application, comprising:
    means for obtaining a database schema that defines at least one artifact;

means for obtaining an application usage specification that defines the application as a plurality of states and a plurality of transitions, wherein the at least one artifact is associated with one of the plurality of states;

means for obtaining a consistency specification that corresponds to at least one transaction, wherein the at least one transaction comprises at least one of the plurality of states and one of the plurality of transitions and the consistency specification includes at least one of a read consistency and a write consistency to apply to the at least one artifact; and means for generating the application using the database schema, the application usage specification, and the consistency specification;

wherein the artifact is one selected from the group consisting of a variable, a relationship, and an attribute, wherein the application accesses data from a database associated with the at least one artifact using a consistency specification when the application enters the at least one of the plurality of the states.

\* \* \* \* \*